United States Patent [19]
Vogrig et al.

[11] Patent Number: 6,053,308
[45] Date of Patent: Apr. 25, 2000

[54] RIVET-HINGED BELT FASTENER WITH TEETH

[75] Inventors: Joseph C. Vogrig; John H. Winkelman, both of Naperville; Edward C. Musil, Orland Park., all of Ill.

[73] Assignee: Flexible Steel Lacing Company, Downers Grove, Ill.

[21] Appl. No.: 08/933,759

[22] Filed: Sep. 23, 1997

[51] Int. Cl.$^7$ ............................. F16G 3/04; B65G 15/30
[52] U.S. Cl. ...................... 198/844.2; 24/31 H; 24/33 P; 24/33 B
[58] Field of Search .................. 198/844.2; 24/33 P, 24/33 B, 33 R, 31 H

[56] References Cited

U.S. PATENT DOCUMENTS

| | | |
|---|---|---|
| 1,476,084 | 12/1923 | Kiefer . |
| 1,482,282 | 1/1924 | Adams ................................. 24/33 P |
| 2,179,697 | 11/1939 | Kremer . |
| 2,454,224 | 1/1948 | Shook . |
| 2,477,855 | 8/1949 | Beach . |
| 2,935,774 | 5/1960 | Schick . |
| 2,999,284 | 9/1961 | McComb . |
| 3,010,168 | 11/1961 | Leflon . |
| 3,176,358 | 4/1965 | Leflon . |
| 3,737,954 | 6/1973 | Tabler ................................. 198/844.2 |
| 3,742,557 | 7/1973 | Francois . |
| 4,625,369 | 12/1986 | Musil . |
| 4,815,587 | 3/1989 | Musil . |
| 5,095,590 | 3/1992 | Schick . |
| 5,157,812 | 10/1992 | Musil . |
| 5,524,808 | 6/1996 | Vogrig . |
| 5,553,359 | 9/1996 | Herold . |

FOREIGN PATENT DOCUMENTS

25274  11/1911  United Kingdom .

*Primary Examiner*—Christopher P. Ellis
*Assistant Examiner*—Mark A. Deuble
*Attorney, Agent, or Firm*—Fitch, Even, Tabin & Flannery

[57] ABSTRACT

A hinged fastener for splicing transverse ends of conveyor belts together with the belt fastener having teeth that are bent from one of the fastener plates for piercing and sinking into the belt to increase the holding power of the fastener. In the preferred form, the fastener is attached to the belt end with two rivets with the teeth being adjacent the rivets to provide a small, low cost, high performance fastener. The teeth are formed by bending them down from the outer edge of the plate and about a bend line parallel to the inner edge of the plate so that the teeth face the belt end to keep the teeth from being pulled through the belt material. The location of the teeth adjacent the rivets maximizes the depth of penetration of the teeth into the belt for improved fastener holding power and minimizes the likelihood that the teeth will be bent upward and lose holding power when the belt is highly tensioned.

18 Claims, 5 Drawing Sheets

RIVET-HINGED BELT FASTENER WITH TEETH

FIELD OF THE INVENTION

The invention relates to a hinged belt fastener and, more particularly, to a hinged belt fastener utilizing teeth for improved holding power.

BACKGROUND OF THE INVENTION

Mechanical belt fasteners are widely employed in a variety of conveyor belting applications for splicing ends of conveyor belts together. There are hinged fastener systems that have fasteners with upper and lower plates joined by arcuate loops. The plates have apertures therein with respective apertures in the upper and lower plates being aligned so that fastener members, e.g. nails, staples, bolts, rivets, can be installed through the apertures and the belt for clamping the plates on the corresponding belt upper and lower surfaces. With the hinged fasteners so attached, the loops project beyond the belt end for cooperating with loops of similar fasteners attached on another belt end to form a passageway through the mating loops for receiving a hinge pin therethrough.

There are a number of hinged fastener systems available. In selecting hinged fasteners, a number of factors are taken into consideration. Choosing an appropriate hinged fastener for a conveyor system requires taking into account the tensile strength of the belts employed and the pulley diameters in the conveyor drive system on which the belt is to be run. One inch wide samples of belts are subjected to dumbbell tests by belt manufacturers with their breakage point measured to determine their UTL (ultimate tensile strength). The fasteners are rated by their PIW (pounds per inch of width) that they can withstand before failure, with an appropriate safety factor, i.e. 4:1, included in their PIW rating. Belt fastener manufacturers provide recommended usages for their particular fasteners so that the fasteners do not fail at high pull-out or tension forces before the belt gives way to applied tension at its splice such as by belt breakage or comb out of the fasteners through the belt material. Fastener manufacturers also provide guidelines for the hinged belt fastener that should be selected for travel over the smallest pulley in the conveyor drive system.

As is apparent, a major goal of belt fasteners is to provide the fastener with strong holding capacity without over design of the fastener for its particular conveyor application, which can range from light-weight assembly line and checkout counter applications to medium and heavy-duty applications such as in underground mines and in aggregate plants. An over-designed fastener can have plates that are too thick and have a higher profile than necessary for the belts with which they are designed to be used which can create problems in travel of the spliced belt about smaller pulleys and with scraper blades used for cleaning the belts. On the other hand, it is generally understood that the larger the plates of the fastener and the greater the reachback of the fastener plates onto the belt surface, the higher durability and strength of the gripping and holding force of the fastener on the belt end. A fastener's reachback is typically determined by the distance from the belt stop thereof against which the end of the belt is abutted and the outboard edges of the fastener plates. Thus, proper abutment of the belt end with the belt stop before attaching the fasteners to belt ends maximizes the reachback of the fasteners and thus their holding power.

With respect to rivet-hinged fasteners, their holding power is generally improved as greater numbers of rivets are utilized, such as three or five rivets over a two rivet fastener. However, the greater number of rivets increases the size of the plates so that both the higher number of rivets and larger plates drives up the cost for the belt fasteners making the fastener more expensive than is desirable. Accordingly, a less expensive, smaller fastener, e.g. a two rivet fastener, that provides strong holding power such as comparable to that provided by three rivet fasteners for medium duty applications would be desirable. As mentioned, such a smaller fastener would also provide advantages in terms of its lower profile and ability to travel over small diameter pulleys.

It is known to use teeth that are bent down from an upper plate of a hinge fastener for improved holding power. The assignee herein has bolt hinged fasteners where a single high strength bolt is used to attach the fastener onto a belt end. Teeth are bent from the side of one of the plates so that the teeth are generally perpendicular to the edge or end of the belt. The above-described teeth are effective to provide the bolt hinged fastener with improved holding capacity; however, with the perpendicular arrangement of the teeth relative to the belt end, they are more likely to serve as a knife edge cutting through the belt material under high applied tensile forces. Accordingly, better designed teeth that are more resistant to being pulled through the belt material under tensile loads would be desirable.

If splices of conveyor belts fail during conveying operations, abrupt shutdowns can occur potentially causing damage to the conveying system and products conveyed thereby and creating safety hazards. In addition, such shutdowns can require expensive repairs and lead to lengthy downtimes lowering productivity. Thus, a conveyor splicing system that provides an early warning as to potential splice failures would be desirable so that conveyor operators or workers get a visual indication of the beginning of splice stress and fatigue, i.e. pull-off of the belt end from the fastener belt stops, before the splice fails. In this manner, the workers are afforded an opportunity to shut down the conveyor line and perform necessary repairs without the sudden conveyor shutdown occasioned by belt splice failure.

Another feature of present belt fasteners that assists in providing good holding power and a low profile fastener attached onto the belt end is that the outer or outboard edges of the plates are generally beveled or coined so that when the plates of the fastener are clamped to the belt surfaces, the sharp edges of the plates will bite into the belt surface. Generally, the outboard edges extend straight across the plate parallel to the end of the belt with rivet apertures spaced back from this straight edge. Where there are a pair of apertures adjacent the straight outboard edge, it has been found that there is too much material spaced from the apertures for the belt edge to get a good grip or bite into the belt. Accordingly, there is a need for a fastener with improved belt gripping at the outboard edges thereof.

Another consideration in the design of hinged rivet belt fasteners is that they should be compatible for use with existing installation tools. There is a commercially available installation tool provided by the assignee herein which is for gang driving of all five rivets of a five-rivet fastener simultaneous. This is accomplished by use of a gang driver whose multiple drive rods are inserted into through holes in a guide block for driving the rivets towards a lower anvil plate of the tool and setting the lower ends of the rivets against raised rivet head forming bushings aligned with the rivet guide holes in the guide block which match the five rivet pattern of the fastener. Where the fastener uses less than five rivets such as the preferred two rivet fastener herein, there will be raised bushings that are not necessary for forming rivet heads. Accordingly, the plates of rivet-hinged fasteners, and particularly the lower plates thereof should be capable of insertion over the anvil plate while accommodating and clearing any raised bushings that are not used for setting rivet heads so that the smaller fastener herein can be used in current five rivet-hinged fastener installation tools.

SUMMARY OF THE INVENTION

In accordance with the present invention, a hinged fastener is provided for splicing transverse ends of belts together with the belt fastener having teeth that are bent from one of the plates for piercing and sinking into the belt to increase the holding power of the fastener. While the hinged belt fastener described herein has two rivets and two teeth, it will be recognized that different numbers and types of fastener members, e.g. nails, staples, belts, and different numbers teeth can be utilized. Thus, belt fastener using more than two rivets and using fasteners other than rivets will still fall within the purview of this invention. In one particular form, the teeth are preferably used with a hinged riveted fastener which uses only two rivets so as to keep the size of the fastener small for lower cost and improved fastener performance in travel over small pulleys of conveyor systems. The teeth of the present invention are formed by bending them down from the outer edge of the plate and about a bend line parallel to the inner edge of the plate so that the teeth face the belt end to keep the teeth from being pulled through the belt material. The teeth are adjacent the rivets, which compress the belt and thereby allow the adjacent teeth to maximize the depth to which the teeth are sunk into the belt when the fastener is riveted thereto to increase the holding power of the fastener against tensile forces applied thereto. By placing the teeth adjacent the rivets, the teeth are less likely to bend upwardly and thereby lose their holding power when the belt is highly tensioned.

In a preferred form, the rivet apertures are generally circular in shape and the bend lines of the bent down teeth are aligned along a line extending through the centers of the circular apertures parallel to the edges of the plate having the teeth. It has been found that with the teeth aligned along the center of the rivet apertures, there is improved biting of the teeth into the belt to provide the riveted fastener herein with improved holding power over two-rivet fasteners without teeth and with holding power approaching that provided by prior commercially available three rivet fasteners.

The teeth preferably have pointed portions, and the outer end of the plate having the teeth is straight and extends substantially parallel to the plate inner edge. Side portions of the plate are provided that extend obliquely relative to the plate straight outer edge along and beyond the rivet apertures so that the bent down teeth have an outer side that extends downward and inward for forming the point portions of the teeth for piercing into the belt. More particularly, the oblique side edge portions and the plate outer edge meet at opposite corners so that distal tips of the point portions reside at the corner before the teeth are bent from the outer edge of the plate. A cut line extends substantially perpendicular to the outer edge from the corner at the outer edge inward to the bend of the teeth adjacent the rivet apertures for bending of the teeth from the plate so that the teeth have an inner side that extends substantially perpendicular to the plate.

In one form, the plate having the teeth is the upper plate and at least one of the upper and the lower plate has its outer edge contoured to follow the contour around the rivet apertures. This reduces the amount of plate material spaced between the apertures for improved biting of the contoured edge into the lower belt surface for additional belt gripping and tensile force resistance and for a lower profile lead in to belt scrapers that may be used on the conveyor line. That is, the belt fastener leading edge will not abut the belt scraper with a long continuous leading edge across the width of the belt fastener. The contoured outer edge of the lower plate also allows the two rivet fastener herein to be inserted into a five rivet fastener applicator for riveting the present fastener onto a belt end. As the material between the pair of rivet receiving apertures of the lower plate adjacent the outer edge is removed in the fastener herein, clearance is provided for inserting the lower plate into the applicator for larger five rivet fasteners without interference from the unused rivet setting portions of the applicator anvil plate.

In another form of the invention, the fastener includes upper and lower plates joined by arcuate hinged loops with the plates being attached onto upper and lower surfaces of the belt and the loops projecting beyond the belt end. Pairs of rivet receiving apertures are formed in the plates and are substantially vertically aligned with each other when the plates are on the respective belt surfaces. The plates have inner and outer edges with the inner edges extending generally parallel to the belt end and the rivet receiving apertures being spaced from each other across the plates substantially parallel to the plate inner edges. The pair of rivets are inserted through the rivet receiving apertures to attach the fastener plates onto the belt end. Teeth of the upper plate are bent down from the upper plate about a bent line parallel from the upper plate inner edge. The teeth are on either side of the rivet receiving apertures in alignment across the plate with centers of the rivet receiving apertures to increase the holding strength of the teeth and riveted attachment of a fastener to the belt while minimizing the reachback distance between the inner edges of the plates at the end of the belt and the plate outer edges clamped onto the belt for travel over small diameter pulleys.

In another aspect of the invention, a belt fastener having upper and lower plates joined by arcuate hinged loops is provided and includes a belt stop extending up from the inner edge of the lower plate for abutting the end of the belt when inserted between the upper and lower plates. A window cut-out is formed in the upper plate so as to allow viewing of the belt stop from over the top of the fastener for determining if the belt end is properly abutted thereagainst before attaching the fastener to the belt end. Preferably, the belt stop extends up perpendicular from the inner edge of the lower plate and the window cut-out opens to the inner edge of the upper plate to provide a line-of-sight over the top of fastener to the window to the belt stop therebelow.

It is preferred to use the above window cut-out in hinged fasteners provided with teeth as earlier described, as the teeth can require that the plates be bent open for fitting the belt end therebetween causing visibility of the belt stop to be lost. Rather than requiring a worker to go around to get an end view of the fastener strip on the belt end in the applicator tool to determine if the belt is properly abutting the stop, the window provides an additional and more convenient line-of-sight to the belt stop from over the top of the fastener.

Preferably, the window cut-out is not in every fastener in a strip, and instead is in every third or fourth fastener, and is minimized in size so as to limit sifting of material during conveyor operations.

Another advantage of the window cut-out is that the spacing between the end of the belt and belt stops can be visually checked to give an early indication as to whether a splice failure is imminent.

DETAILED DESCRIPTION OF THE PREFERRED EMBODIMENTS

Figure 1:
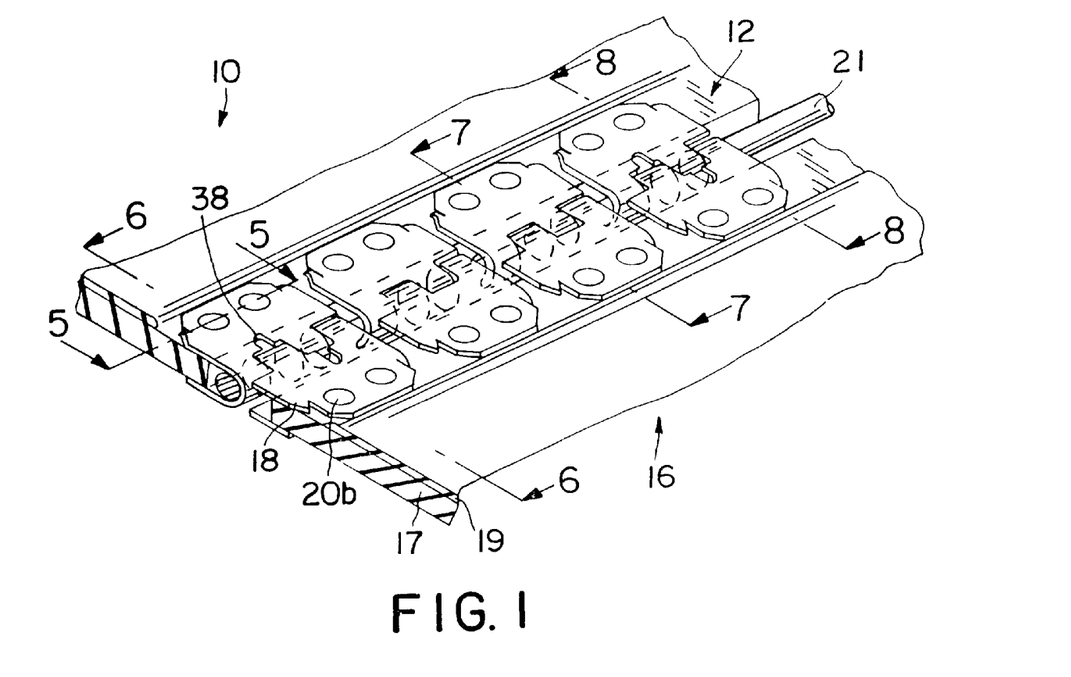
FIG. 1 is a perspective view of rivet-hinged belt fasteners in accordance with the present invention showing two strips of such fasteners attached onto respective belt ends to hinge the belt ends together.
Figure 2:
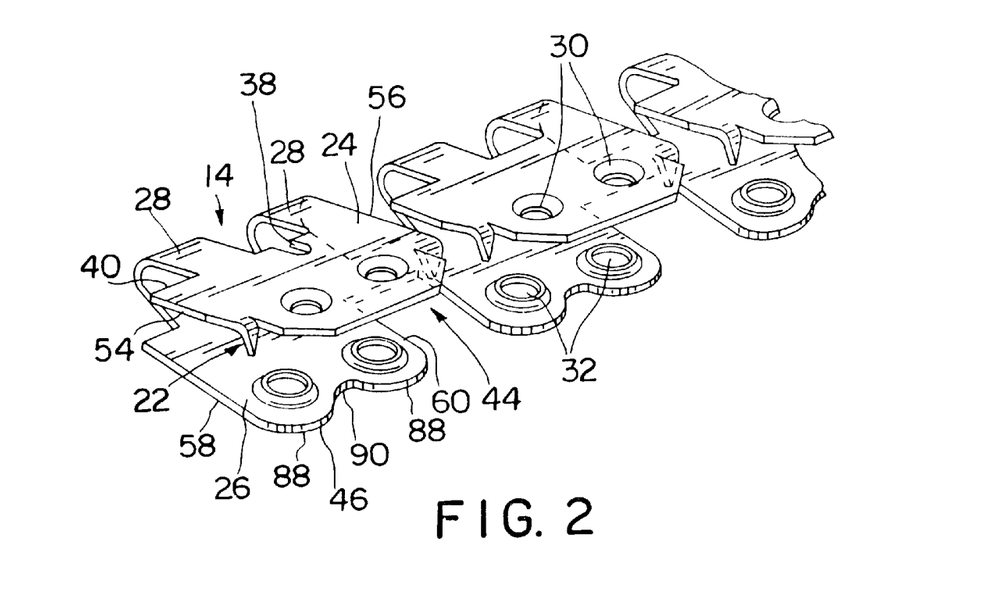
FIG. 2 is an enlarged perspective view of a strip of rivet-hinged belt fasteners before riveting of upper and lower plates thereof to a belt end and showing teeth formed on the upper plate adjacent the upper plate rivet receiving apertures.
Figure 4:
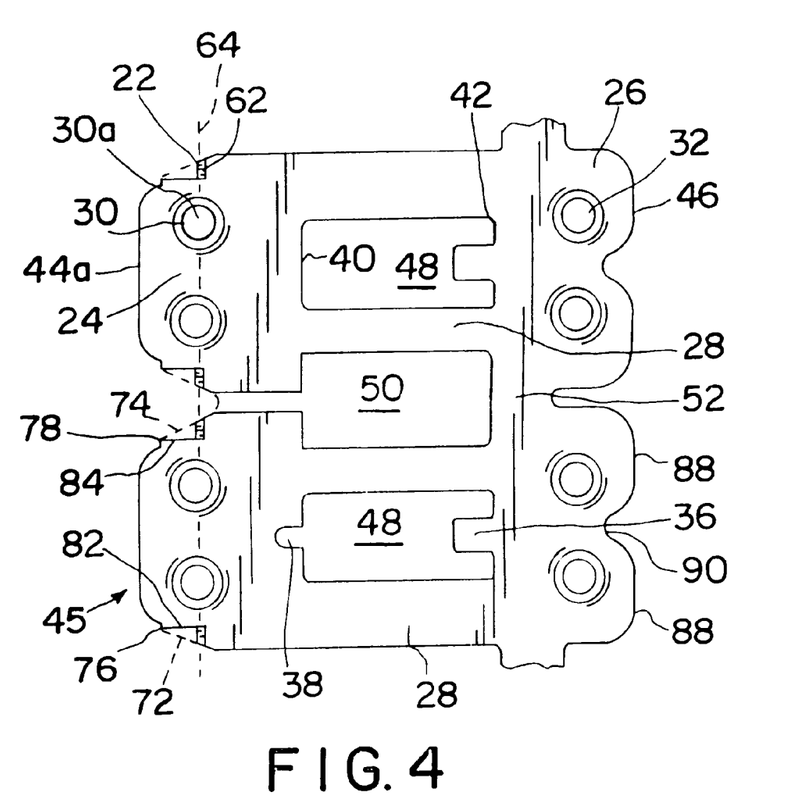
FIG. 4 is a plan view of a strip of metal to be formed into the rivet-hinged fastener in accordance with the present invention and showing the alignment of bend lines for the teeth with the centers of the rivet receiving apertures.

FIG. 1 illustrates a spliced conveyor system 10 utilizing a strip 12 of rivet-hinged belt fasteners 14 for splicing conveyor belts 16, and particularly ends 18 thereof together as by a hinged connection. Referring to FIGS. 2 and 4, the rivet-hinged belt fasteners 14 herein preferably only utilize two rivets 20 in each fastener 14 and have teeth 22 formed adjacent thereto so that the teeth 22 bite into the belt 16 substantially along their entire length when the fastener 14 is riveted thereon to provide increased holding power for the relatively small two rivet fastener 14 with the location of the teeth 22 relative to the rivets 20 and their orientation relative to the belt end 18 giving them improved resistance against unfolding when subjected to high tensile forces. The fasteners 14 each include upper and lower plates 24 and 26 adjoined by a pair of spaced arcuate hinged loops 28. The plates 24 and 26 each include a pair of countersunk rivet receiving apertures 30 and 32, respectively, therein. The teeth 22 are preferably provided in only one of the plates 24 and 26 on either side of rivet receiving apertures 30 or 32 thereof for maximizing the depth to which the teeth 22 are sunk into the belt 16, as will be more fully described hereafter.

Figure 5:
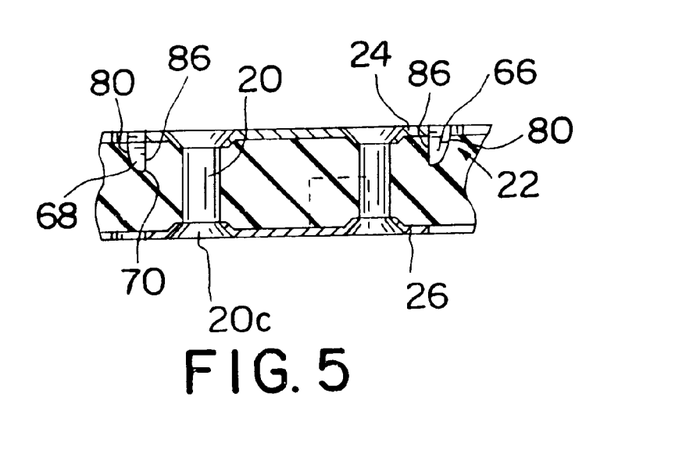
FIG. 5 is a sectional view taken along line 5—5 of FIG. 1 and showing the upper plate teeth adjacent either side of the two rivets of the rivet-hinged fastener in accordance with the present invention.

In accordance with the present invention, the teeth 22 are located adjacent the rivets 20 with the fastened rivets compressing the belt, thereby allowing the teeth 22 to be located in the belt at a compressed area of the belt. The rivets hold the belt adjacent thereto from stretching and bending upwardly, which would reduce the holding power of the teeth when the belt is under high tensile loading. Best results have been obtained in holding power when the teeth 22 are in alignment with a central axis through the center of the rivets and rivet apertures 30. More specifically, it is preferred, as will be explained in more detail hereinafter, that each bend line 62 (FIG. 4), about which a tooth is bent down from the upper plate, be aligned with a straight line 64 through the respective axes 30a of the rivet apertures 30. Thus, the teeth are preferably located, as seen in FIGS. 4 and 5, closely adjacent to and aligned with the rivets 22; and the compressed areas of the belt about the rivets to provide a good holding power for the rivets when the belt is highly tensioned and stretched which, if the teeth were located at the wrong positions, could bend the teeth upwardly enough to lose some holding power.

In the illustrated and preferred form, the teeth 22 are formed from the upper plate 22 for ease of fastener installation as teeth 22 on the bottom plate 26 require more work to lift the belt 16 so that it clears over the teeth 22 extending up from the bottom plate 26 when inserting the belt end 18 between the fastener plates 24 and 26. For installing the present fastener 14 having teeth 22 on its upper plate 24, it is preferable that the top surface 16a of the belt 16 be skived across its end 18 to form a transversely extending groove 18a thereat. This is of particular importance with belts 16 that have a main woven fabric core 17 covered with a protective rubber layer 19 as the teeth 22 should penetrate into the core 17 to provide the desired holding power for the present fastener 14. Skiving the belt end 18 removes the rubber coating 19 thereat so that when the fastener strip 12 is attached onto the belt end 18 with the upper plate 24 clamping down on the transverse groove 18a thereof, the small teeth 22, e.g. 3/16 inch long, projecting down from the fastener upper plate 24 will pierce and sink into the woven carcass core 17 of the belt 16 at the skived groove belt end 18a alongside the rivets 20 extending therethrough to provide the small two rivet fastener 14 with a PIW rating that is higher than such a two rivet fastener without teeth and which approaches the PIW provided by the commercially available three rivet fastener depicted in FIG. 12. In addition, skiving the belt end 18 keeps the top of the fastener upper plate 24 substantially flush with the belt upper surface 16a so that it does not project thereover for improved performance in travel over pulleys and so that conveyor scrapers used for cleaning the belt are not damaged thereby.

Comparative testing of the above fasteners on a commercially available conveyor belt was conducted by subjecting the fasteners to tensile tests from which an average PIW for the fastener was generated. In this testing, the two rivet fastener without teeth had a PIW rating of 314, and the present two rivet fastener 14 having teeth 22 showed an increase in its PIW to 364. As can be seen by the above, the provision of the teeth 22 gave a good increase of the fastener PIW over a similarly sized fastener such that its PIW was close to that afforded by larger three rivet fasteners without the detriments occasioned by their bigger size, such as in cost differences and their inability to travel over small pulleys.

Figure 10:
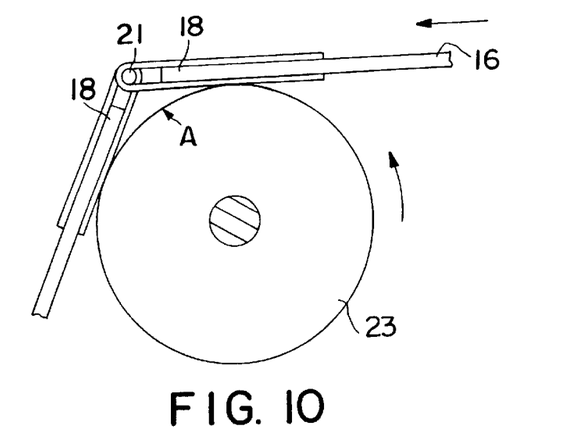
FIG. 10 is a schematic view of the larger prior art three rivet-hinged fasteners traveling over a smaller diameter pulley.
Figure 11:
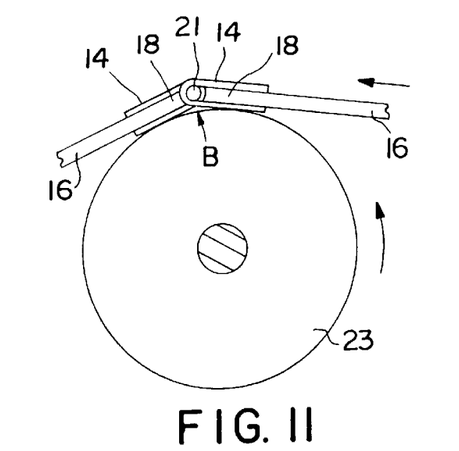
FIG. 11 is a schematic view of the smaller rivet-hinged fasteners in accordance with the present invention traveling over the small diameter pulley.
Figure 12:
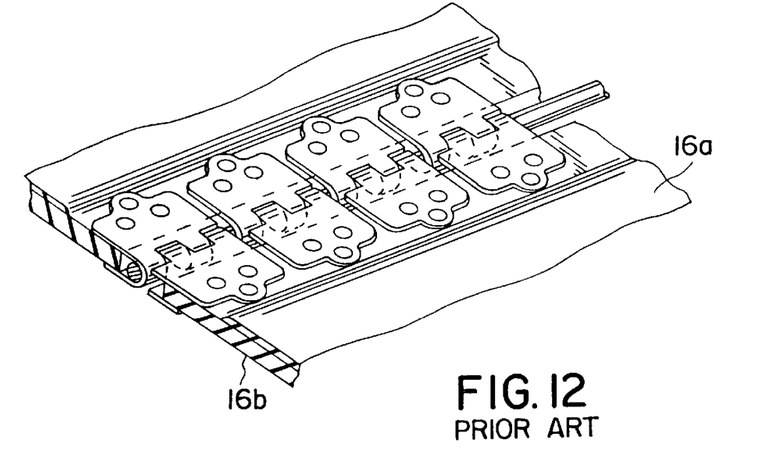
FIG. 12 is a view of a larger prior art three rivet-hinged belt fastener.

Referring to FIGS. 10 and 11, the prior art three rivet fasteners of FIG. 12 is shown attached on belt ends 18 with the fasteners hinged together by pin 21 in FIG. 10 and the hinged belts 16 travelling around a small diameter pulley 23, e.g. five inches in diameter; FIG. 11 shows the smaller two rivet fasteners 14 herein similarly attached on belt ends 18 that are hinged together and travel about the pulley 23. As can be seen, the gap distance A from the center of hinge pin 21 to the surface of the pulley 23 as the leading belt end 18 travels down the downstream side of the pulley 23 is much greater than the corresponding gap distance B provided by the smaller two rivet fasteners 14 herein. Large gaps A such as in FIG. 10 are to be avoided for smooth, trouble-free conveyor operations with hinged belt fasteners used for splicing belt ends 18 together. Accordingly, the small two rivet fastener 14 provides for much greater flexibility as it has reduced reachback while still being able to be used in medium duty applications due to the increased PIW because of its teeth 22, and it can be used with smaller diameter pulleys 23 in pulley drive systems for conveyors versus the larger three rivet fastener.

Returning to the construction and installation of the fastener 14, generally the upper plate 24 extends at a slight angle relative to the lower plate 26 when the fastener 14 is unclenched before it is attached to the belt 16, as best seen in FIG. 2. Clenching the upper plate 24 down towards the conveyor belt groove 18a brings the respective upper and lower apertures 30 and 32 into vertical alignment with each other for receiving shanks 20a of the rivets 20 therethrough. The rivets 20 have a preformed upper head 20b and a hollowed out portion of their lower end for being upset to form lower rivet head 20c for setting in the lower plate counter sunk apertures 32.

To attach the fastener strip 12 herein onto a belt end 18, a currently utilized fastener application or installation tool 34 can be utilized, as will be more fully described hereinafter. As shown, the belt 16 is inserted between the upper and lower plates 24 and 26 until the belt end 18 engages belt stop projection 36 formed on the fastener lower plate 26. With the belt end 18 abutting the stops 36, the present toothed fastener 14 can be secured in the tool 34 in proper position therein for being riveted onto the belt 16 by simply driving as by hammering a couple of fasteners 14 in the strip 12 to clench them against the belt 16 to sink the teeth 22 therein. In the current installation process for conventional belt fasteners without teeth, once the belt end 18 is inserted against the belt stops, the belt 16 is clamped in place with a clamping device of the tool. The fastener 14 with teeth 22 obviates the need to clamp the belt 16 in place with the conventional clamping device providing for quicker installation of the present fasteners 14 with the clamping device being left unused. The clamping device can be eliminated from the tool 34 so as to provide for a less complicated tool that can be used to attach the fasteners 14 onto belt ends 18.

Particularly with the smaller fastener 14 herein it is extremely important that the belt end 18 be in proper engagement abutting the belt stop 36 so that the full amount of the fasteners reachback is utilized. Fastener reachback is the distance from the end 18 of the belt 16 to the plate outer edges 44 and 46 clamped onto the belt upper and lower surfaces 16a and 16b, respectively. With the preferred fastener 14 herein, the reachback of the upper plate 24 is relatively small at approximately 1 inch in comparison to the longer corresponding upper plate of the medium duty commercial fastener depicted in FIG. 12. Proper belt end 18 engagement with the stops 36 is important because of the reduced reachback of the present fasteners 14 over prior larger fasteners and because they only use two rivets.

An additional feature of the present invention is the provision of a window cut-out 38 formed in the upper plate 34 that is generally aligned over the belt stop projection 36 so to provide a line-of-sight from over the top of the fasteners 14 to the belt stop projection 36 therebelow. This is particularly important in the fasteners 14 having the teeth 22 as they will normally require that the upper plate 24 be bent upward somewhat so as to provide sufficient room for sliding the conveyor belt 16 between the fastener plates 24 and 26. During such an operation the visibility of the belt stop can be lost. Accordingly, with the window 38 herein, a worker need not stop, walk around and stoop down to get an end view of the belt stop projection to determine whether it is properly abutted with belt end 18 before riveting the fastener 14 onto the belt 16.

Such visual confirmation may be important because it can be hard to feel whether the belt end 18 has engaged the belt stop 36 particularly with very wide and thin belts such as with belts that are on the order of 36 inches or 48 inches wide and which have thicknesses ranging from an ⅛ to ¼ inch thick. These wide and thin, flimsy belts require two workers on either side thereof for inserting them between the plates 24 and 26 of the fasteners 14 in a strip 12. The workers can simply look through the window cut-out 38 from over the fasteners 14 to determine if the belt end 18 has been inserted to the proper depth between the plates 24 and 26 in engagement with the belt stop projections 36 of the fasteners 14 so as to obtain the increased holding power from the full reachback provided by the fasteners 14 herein. It is preferred that the window cut-out 38 be provided in every third or fourth fastener 14 in a strip 12 and to be relatively small in size so as to minimize any sifting problems with contaminants getting below the belt and onto the pulley rollers, such as rock dust and fragments that are present in mining operations.

Another advantage afforded by the above-described window cut-out 38 is that during conveyor operations, it can be utilized to check to see how far the belt end 18 has pulled away from the belt stops 36 to give an early indication of any potential failures of the belt splice. It can be determined for particular belt 18 and fastener 14 combinations at what predetermined spacing of the belt end from the stops that the conveyor line should be stopped for performing the necessary repair at the splice. In this manner, expensive and potentially dangerous sudden conveyor shutdowns are avoided.

Figure 7:
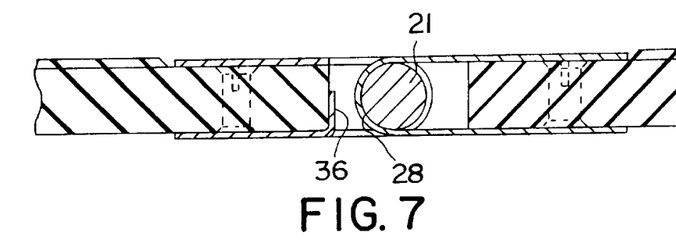
FIG. 7 is a sectional view taken along line 7—7 of FIG. 1.

Turning now to a more detailed description of the fastener 14 and specifically with reference to FIG. 4, the upper and lower fastener plates 24 and 26 are provided with respective inner or inboard edges 40 and 42 and respective outer or outboard edges 44 and 46. To form the loops 28, generally rectangular cut-outs 48 are punched in the flat metal strip 45 in the sections that are to be formed into the fasteners 14 with rectangular cut-out 50 punched out therebetween. As shown, the belt stop projection 36 projects into the cut-outs 48 from the inner edge 42 of the lower plates 26 between the loops 28 before they are bent up at substantially right angles to the plates 26 to extend perpendicular relative thereto. Between adjacent lower plates 26 and the strip 12, a bridge portion 42 is provided to interconnect individual fasteners 14 of the strip 12. The window 38 for viewing of the belt stop is punched in the upper plate 24 to open to the inner edge 40 thereof between the loops 28 so that when the fasteners 14 are formed, it will be in substantially overlying relation to the belt stop projection 36 extending perpendicular from the lower plate 26 up towards the upper plate 24 (FIG. 7).

The pairs of apertures 30 and 32 in respective upper and lower plates 24 and 26 are aligned across the plates from each other substantially parallel to their respective inner edges 40 and 42 which are straight edges that are interrupted by the loops 28 projecting rearward therefrom. The upper plate preferably has an outboard edge 44 that has a central straight portion 44a which extends substantially parallel to the upper plate inner edge 40. Referring to FIG. 2, the upper plate 24 has opposite sides 54 and 56 that extend between the upper plate inner and outer edges 40 and 44 with the side 56 extending beyond the inner edge 40 to form one of the arcuate loops 28 of the pair of loops 28 associated with each fastener 14. Similarly, the lower plate 26 includes opposite sides 58 and 60 which extend between the lower plate inner and outer edges 42 and 46 with the side 60 extending beyond the inner edge 42 to form one of the arcuate loops 28 of the pair of loops 28 associated with each fastener 14.

Figure 6:
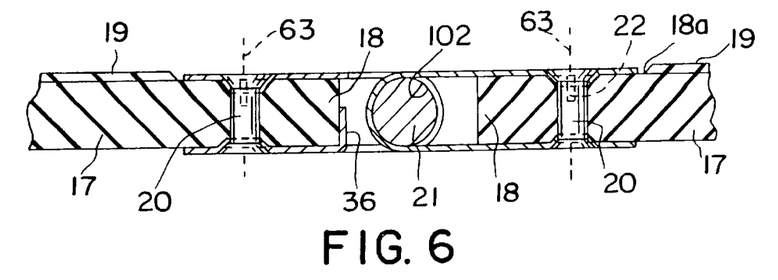
FIG. 6 is a sectional view taken along line 6—6 of FIG. 1.
Figure 8:
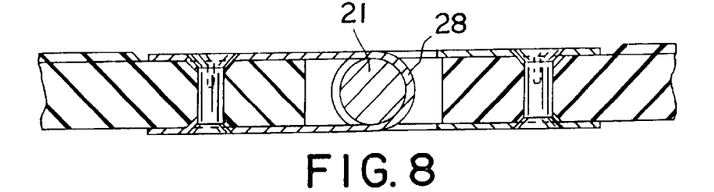
FIG. 8 is a sectional view taken along line 8—8 of FIG. 1.

As previously mentioned for forming the teeth 22, they are preferably bent from the front outer edge 44 of the upper plate 24 so that they are adjacent the generally circular countersunk rivet receiving apertures 30. In the preferred and illustrated form, the teeth 22 are spaced on either side of the pair of apertures 30 by bending them down about bend lines 62 that lie on a line 64 extending through the centers 30a of the upper plate rivet apertures 30. In this manner, the bend lines 62 extend substantially parallel to the upper plate inner edge 40, and with the preferred straight outboard edge portion 44a parallel thereto as well. In other words, the central vertical axes 63 of the rivets 20 will also extend through the bent down teeth 22, as best seen in the sectional views of FIGS. 6–8. Accordingly, with teeth 22 bent from the plane of the flat upper plate 24 so as to extend substantially perpendicular thereto about bend line 62, the teeth will have a major face 66 that faces towards the upper plate inner edge 40. Thus, when the fastener strip 12 is attached on to the belt end 16 with the inner edges 40 of the upper plates 24 and the inner edges 42 of the lower plate 26 substantially vertically aligned with the end 18 of the belt 16 properly abutted against the fastener belt stop 36, the bend lines 62 for the teeth 22 will extend substantially parallel to the belt end 18 with the teeth inner surfaces 66 facing toward the belt end 18. With the above described construction of the teeth 22, they will be more resistant to being pulled out through the belt material when exposed to high tensile forces than the prior teeth that are perpendicular to the belt end so that their sides act to cut through the belt material when they are pulled by high tensile forces.

For piercing and sinking into the belt carcass 17, the teeth 22 have a pointed portion 68 having a sharp distal tip 70 thereof. To form the teeth pointed portions 68, in the preferred form, the upper plate sides 52 and 56 include side edge portions 72 and 74 associated with respective plate sides 54 and 56 before the metal strip 45 is formed into its final fastener strip 12 form, and specifically before the teeth 22 are bent from the upper plate 24. These side edge portions 72 and 74 as shown in dashed lines in FIG. 4 extend at an angle or obliquely from the respective upper plate sides 54 and 56 towards the outboard edge 44 of the upper plate 24. The outboard edge 44 jogs at either end thereof slightly inwardly so that it forms opposite corners 76 and 78 with the oblique side edge portions 72 and 74, respectively. When the teeth are bent about their bend lines 62 out from the plane of the upper plate 24, the side edge portions 72 and 74 of the metal strip 45 become outer sides 80 of the teeth 22 that extend down towards the bottom plate 26 and inwardly towards the adjacent rivet 20, as best seen in FIG. 4.

The plate 24 has respective cut lines 82 and 84 formed therein for bending of the teeth 22 with the cut lines 82 and 84 extending from the corners 76 and 78, respectively, inward towards the upper plate inner edge 40 terminating at teeth bend lines 62. Before the teeth 22 are bent about the bend lines 62 their distal sharp tips 70 reside at the corners 76 and 78 at the juncture of the cut lines 82 and 84 with respective oblique edge portions 72 and 74. In this manner, when the teeth 22 are bent from the plane of the plates 24 each of the teeth 22 will have an inner side 86 that extends substantially perpendicular to the plate 24, as best seen in FIG. 4. Accordingly, the teeth 22 are formed with sharp tips 70 on their pointed portions 78 at the intersection of their straight inner sides 86 with the orthogonal or angled outer side 80 for piercing into the belt carcass 17 to sink the teeth 22 therein. With the straight, vertical, inner sides 86 and vertically angled, outer sides 80 of the preferred teeth 22, the teeth 22 are provided with greater mass along their side closest to the rivet apertures 30, i.e. the teeth inner side 86, and thus, are stronger thereat. However, it will be recognized that other forms of teeth 22, such as with the configuration of the sides 80 and 86 switched, could also be employed.

For improved belt gripping and for a lower lead-in profile for the belt fasteners, it is known to bevel or coin the outboard edges 44 and 46 of hinged fasteners so that the edges of the plates provide a lower profile and grip into the belts when the plates are clamped thereto. The outboard edges 44 and 46 of the present two rivet fastener 14 are similarly beveled for biting into the belt carcass. As previously mentioned, one problem that has been observed where there are two rivets adjacent the fastener outboard edges such as in the two rivet fastener 14 herein, is that the sinking of the coined edges into the belt 18 for a lower profile of the fastener 14 can be compromised because there is too much plate material spaced from the plate rivet receiving apertures. In this regard, the lower plate 26 of the fastener 14 herein is provided with a scalloped or contoured outboard edge 46 so that it generally follows the contour around the rivet apertures 32 formed in the lower plate 26. Thus, the lower plate outboard edge 46 includes two outer sections 88 that are curved and meet at an inner oppositely curved section 90 so that the outboard edge 46 generally curves around the circular rivet openings 32, as best seen in FIGS. 2 and 4.

With such a scalloped edge 46, there is less plate material spaced from the rivet apertures 32 such as if the edge 46 extended straight across between the outer peaks of the outer curved sections 88. By scalloping the outboard edge 46, the bite thereof into the belt carcass 17 is improved when the fasteners 14 are riveted to the belt end 18. The outboard edge 44 of the upper plate 24 can be similarly scalloped for improved sinking thereof into the belt 18 to provide it with an improved lead in profile for being engaged by scraper blades that clean the belt 18. In the illustrated form, the upper plate 24 has the straight portion 44a on the upper plate outboard edge 44 for wear purposes of the upper plate 24 which can come into contact with the products being conveyed on the belt upper surface 16a.

Figure 9:
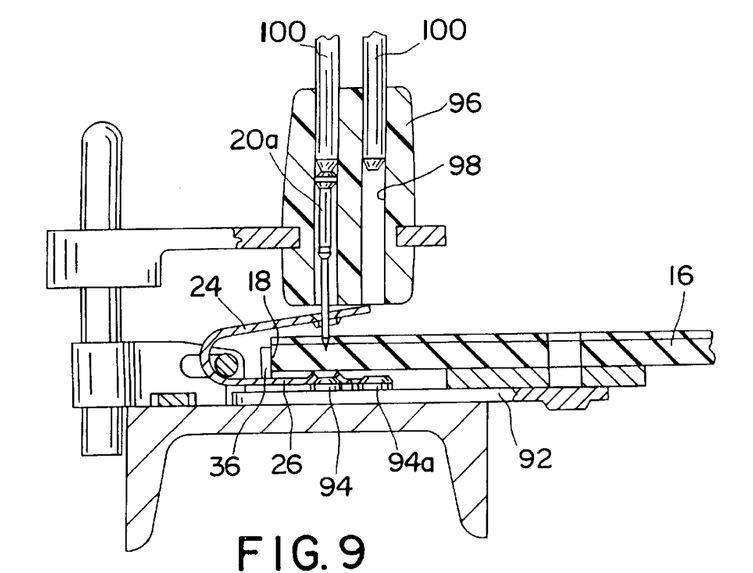
FIG. 9 is a side view partially in section of a commercially available fastener installation tool for five rivet fasteners and showing it utilized with the two rivet fastener of the present invention.

Scalloping of the outboard edge 46 of the lower plate 26 provides the further advantage of allowing the fasteners 14 herein to be installed on conveyor belt ends utilizing the installation tool 34 provided by the assignee herein for being employed with five rivet fasteners. Referring to FIG. 9, the five rivet fastener installation tool 34 includes an anvil plate 92 with rivet head forming bushings 94 raised thereabove. A guide block 96 is mounted above the anvil plate 92 and has through bores 98 formed therein for receiving drive rods 100 of a rivet gang driver. The through bores 98 are provided in a matching pattern to the rivet apertures of the prior art five rivet fastener (not shown) with the bushings 94 also matching the configuration of the bores 98 and rivet apertures. Such fasteners are inserted into the tool 34 and are properly located by aligning their bottom plate apertures over the matching pattern of raised bushings 94 on the anvil plate 92. Once the fastener strips are aligned in the tool 34, the belt 16 is inserted between the fastener plates until its end 18 hits the belt stop 36, as previously described. After the belt 16 is clamped in place by a clamping mechanism (not shown) with its belt end 18 abutted against the belt stops 36 in the fastener strip 12, the drive rods 100 are driven through the guide block bores 98 for driving the rivets 20 through the belt 16 with their hollow ends being upset by the bushings 94 to form the lower heads on the rivets.

As is apparent, utilizing the installation tool 34 with the present two rivet fastener 14 leaves raised bushings such as bushings 94a that will not be used. If the lower plate 26 of the present fastener 14 had a straight outboard edge similar to the upper plate 24, there would be interference between the lower plate 26 straight edge and the unused bushing 94a that is closest to the upper plate 24. However, because the lower plate has a scalloped design with converging outer curved sections 88, the inner curved section 90 will curve around the closest unused bushing 94a, as can be seen in FIG. 9. In this manner, the fastener 14 herein has sufficient clearance from the unused bushing 94a allowing it to be utilized with the installation tool 34 currently employed for installing five rivet fasteners. In addition and as earlier discussed, the clamping mechanism need not be employed, and it can be eliminated from the tool 34 due to the provision of the teeth 22, which can be used to hold the belt 16 in place with the belt end 18 abutted against the belt stops 36 during the riveting process. This provides a quick and easy method of attaching a strip 12 of the fasteners 14 herein onto belt ends 18 with the arcuate loops 28 projecting therefrom.

Figure 3:
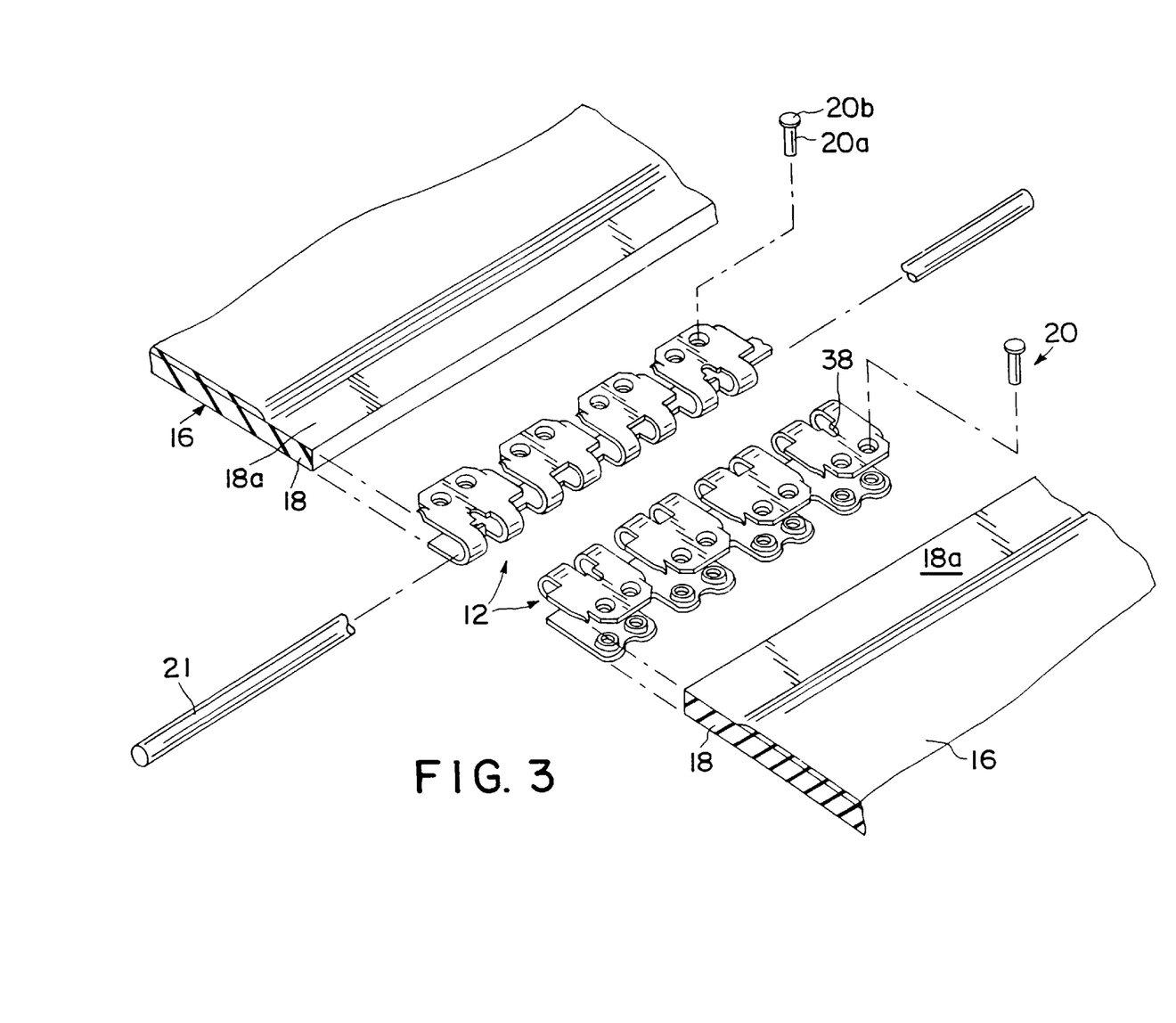
FIG. 3 is an exploded view of FIG. 1 showing the rivet-hinged belt fasteners removed from the belt ends.

Referring to FIGS. 1 and 3, with belt ends 18 having fastener strips 12 riveted thereon such as with installation tool 34, the respective arcuate loops 28 of the fasteners 14 on the belt ends 18 can be mated to form a passageway 102 for receipt of hinge pin 21 therethrough for splicing of belts 16 together to form a secure and strong hinged connection between belt ends 18 which is preferably adapted for use in a wide variety of medium duty applications.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A hinged fastener for splicing transverse ends of belts together, the belt fastener comprising;

upper and lower plates including aligned apertures in the plates for receiving fastener members therethrough and through the belt to clamp the fastener plates onto the belt;

inner and outer edges of the plates with at least a portion of the inner edges extending substantially parallel to the end of the belt with the fastener attached onto the belt end;

outer teeth on one of the plates extending towards the other plate substantially perpendicular to said one plate with the teeth having a proximate portion adjacent the one plate and a distal portion, the teeth tapering from the proximate position to a sharp point at the distal portion to pierce the belt with the sharp distal portion and sink the teeth therein when the fastener is attached onto the belt end, the teeth being spaced from each other at predetermined positions along the one plate with the predetermined positions being spaced from the outer edges of the plate and the apertures being spaced from the outer edges of the plate so that the predetermined positions of the teeth are adjacent the apertures; and bend lines of the teeth adjacent to the apertures and extending parallel to the one plate inner edge portion with the teeth being bent down from the one plate outer edge about their bend lines so that the teeth face the belt end to keep the teeth in the belt from being pulled out from the belt with the teeth being adjacent the fastener members for maximizing the depth to which the teeth are sunk into the belt to increase the holding power of the applied fastener against tensile forces applied thereto.

2. The belt fastener of claim 1 wherein the outer edge of the one plate with the teeth includes a substantially straight portion that extends substantially parallel to the inner edge of the one plate; and side edge portions extend obliquely relative to the one plate outer edge along and beyond the apertures so that the bent down teeth have an outer side that extends downward and inward for forming their point portions for piercing into the belt.

3. The belt fastener of claim 1 wherein the one plate is the upper plate of the fastener with the teeth formed thereon, and the outer edge of at least one of the lower and upper plate is contoured to generally follow the contour around the apertures to reduce the amount of plate material spaced from the apertures so that with the fastener riveted onto the belt end, the contoured edge bites into the corresponding belt surface for a lower profile for the fastener and additional belt gripping and tensile force resistance.

4. The belt fastener of claim 3 wherein the contoured outer edge is on the lower plate and includes two curved sections thereof which curve around each rivet aperture and converge between the rivet apertures to allow the two-rivet fastener to be inserted into a five-rivet fastener applicator for riveting the two-rivet fastener onto a belt end.

5. The belt fastener of claim 1 wherein the lower plate includes a belt stop projection for abutting with the belt end to set the fastener in proper position to be riveted to the belt end, and the upper plate includes a cut out that is substantially aligned over the belt stop to provide a line-of-sight from over the top of the fastener to the belt stop between the fastener plates to determine if the belt end is properly abutted with the belt stop.

6. The belt fastener of claim 5 wherein the belt stop projection of the lower plate projects upward from the lower plate inner edge and the upper plate cut-out is formed along the upper plate inner edge.

7. The belt fastener of claim 5 wherein the lower plate includes a bridge portion connected to a lower plate of another identical fastener to form a fastener strip having a plurality of interconnected fasteners with at least one of the fasteners in the strip including said upper plate cut-out to determine if the belt stops of the fasteners are in abutment with the belt end for attachment of the fastener strip thereon.

8. A belt fastener for being riveted onto a transverse belt end, the combination comprising:

upper and lower plates joined by arcuate hinge loops with the plates being attached onto upper and lower surfaces of the belt and the loops projecting beyond the belt end;

pairs of rivet receiving apertures in the plates which are substantially vertically aligned with each other when the plates are on the respective belt surfaces;

outer and inner edges of the plates with the inner edges extending generally parallel to the belt end and the rivet receiving apertures being spaced from each other across the plates substantially parallel to the plate inner edges;

a pair of rivets for being inserted through the aligned pairs of rivet receiving apertures to attach the fastener plates onto the belt end; and teeth of the upper plate bent down from the upper plate about a bend line parallel to the upper plate inner edge, the teeth being on either side of the rivet receiving apertures in alignment across the upper plate with centers of the rivet receiving apertures to increase the holding strength of the teeth and riveted attachment of the fastener to the belt while minimizing the reachback distance between the inner edges of the plates at the end of the belt and the plate outer edges clamped onto the belt for travel over small diameter pulleys.

9. The combination of claim 8 wherein the outer edge of the lower plate is curved around the rivet apertures formed therein to reduce the amount of plate material spaced out from the apertures for causing the curved outer edge to bite into the lower belt surface when the fastener is riveted onto the belt end.

10. The combination of claim 8 wherein the teeth have sides that meet at the bottom of the teeth to form a sharp tip distal from the upper plate for piercing the belt when the fastener is riveted to the belt end with the fastener plates clamping onto the belt surfaces.

11. The combination of claim 8 including a belt stop of the lower plate projecting upward from the inner edge thereof for abutting with the belt end so that the inner edges of the plates are substantially vertically aligned with each other and the transverse end of the belt;

a bridge portion attached to another identical fastener to provide a plurality of fasteners in a strip for being riveted to a belt end; and a window cut-out in the upper plate of at least one of the fasteners in the strip substantially aligned over the lower plate belt stop to allow for viewing of the belt stop from over the top of the fastener to determine if the belt end is properly abutted thereagainst before riveting of the strip to the belt end.

12. A belt fastener for splicing ends of belts together, the belt fastener comprising:

an upper plate and a lower plate for being attached on opposite upper and lower surfaces of the belt at the end thereof, the plates including portions that are clamped into engagement with respective belt surfaces;

apertures in the plates for being aligned to receive a fastener member through the apertures and the belt to clamp the portions of the plates onto the belt; and a window formed by a cut-out in the portion of the upper plate that is in engagement with the belt upper surface to allow for viewing of the belt upper surface and the end thereof along a line of sight from over the fastener through the cut-out window to determine if the belt end is properly aligned relative to the belt fastener before a fastener member is inserted through the plate apertures for attaching the belt fastener to the belt.

13. The belt fastener of claim 12 wherein the upper and lower plates each include inner and outer edges, and further including a belt stop of the lower plate extending substantially perpendicular thereto towards the upper plate to abut against the belt end inserted between the upper and lower plates and the lower plate belt stop extends up from the lower plate inner edge and the upper plate window opens to the upper plate inner edge so as to provide a line-of-sight from over the top of the fastener to the belt stop before the fastener plates are clamped onto the belt surfaces.

14. A hinged belt fastener for splicing ends of conveyor belts together, the belt fastener comprising:

an upper plate and a lower plate for being attached on upper and lower surfaces of the belt at the end thereof, the upper and lower plates each including inner and outer edges;

apertures in the plates for being aligned to receive a fastener member through the apertures and the belt to clamp the plates onto the belt;

a pair of spaced loop portions extending arcuately from the inner edges of the upper and lower plates to interconnect the plates and defining a space therebetween rearward of the inner edges of the plates; and a window formed in the upper plate to provide a line of sight therethrough forwardly of the inner edge of the upper plate and distinct from a line of sight provided through the space between the loop portions to allow for viewing of the belt end from over the fastener to determine if the belt end is properly aligned relative to the belt fastener before a fastener member is inserted through the plate apertures for attaching the belt fastener to the belt.

15. The belt fastener of claim 14 wherein the lower plate includes a belt stop extending from the inner edge thereof upwardly toward the upper plate, and the upper plate window opens to the upper plate inner edge to allow for viewing of the belt stop from over the fastener to determine if the belt end is abutting the belt stop before attachment of the belt fastener to the belt.

16. A belt fastener for splicing ends of belts together, the belt fastener comprising:

an upper plate and a lower plate for being attached on opposite upper and lower surfaces of the belt at the end thereof;

apertures in the plates for being aligned to receive a fastener member through the apertures and the belt to clamp the plates onto the belt; and a window formed in the upper plate to allow for viewing of the belt end from over the fastener to determine if the belt end is properly aligned relative to the belt fastener before a fastener member is inserted through the plate apertures for attaching the belt fastener to the belt;

wherein with belt ends spliced together and being run on a conveyor system, a predetermined spacing of the belt end from the belt stop is provided for indicating potential splice failure with the window allowing said spacing to be visually observed during routine maintenance of the conveyor.

17. A hinged fastener for splicing transverse ends of belts together, the belt fastener comprising;

upper and lower plates including aligned apertures in the plates for receiving fastener members therethrough and through the belt to clamp the fastener plates onto the belt;

inner and outer edges of the plates with the inner edges extending substantially parallel to the end of the belt with the fastener attached onto the belt end;

outer teeth on one of the plates extending towards the other plate substantially perpendicular to said one plate with the teeth having a pointed portion to pierce the belt and sink the teeth therein when the fastener is attached onto the belt end; and bend lines of the teeth adjacent to the apertures and extending parallel to the one plate inner edge with the teeth being bent down from the one plate outer edge about their bend lines so that the teeth face the belt end to keep the teeth in the belt from being pulled out from the belt with the teeth being adjacent the fastener members for maximizing the depth to which the teeth are sunk into the belt to increase the holding power of the riveted fastener against tensile forces applied thereto, wherein the apertures are generally circular in shape with the bend lines of the bent down teeth aligned along a line extending through the centers of the circular apertures parallel to the edges of the one plate.

18. A hinged fastener for splicing transverse ends of belts together, the belt fastener comprising;

upper and lower plates including aligned apertures in the plates for receiving fastener members therethrough and through the belt to clamp the fastener plates onto the belt;

inner and outer edges of the plates with the inner edges extending substantially parallel to the end of the belt with the fastener attached onto the belt end;

outer teeth on one of the plates extending towards the other plate substantially perpendicular to said one plate with the teeth having a pointed portion to pierce the belt and sink the teeth therein when the fastener is attached onto the belt end; and bend lines of the teeth adjacent to the apertures and extending parallel to the one plate inner edge with the teeth being bent down from the one plate outer edge about their bend lines so that the teeth face the belt end to keep the teeth in the belt from being pulled out from the belt with the teeth being adjacent the fastener members for maximizing the depth to which the teeth are sunk into the belt to increase the holding power of the riveted fastener against tensile forces applied thereto;

wherein the outer edge of the one plate with the teeth includes a substantially straight portion that extends substantially parallel to the inner edge of the one plate;

side edge portions extending obliquely relative to the one plate outer edge along and beyond the apertures so that the bent down teeth have an outer side that extends downward and inward for forming their point portions for piercing into the belt;

the oblique side edge portions and the one plate outer edge meeting at opposite corners so that end tips of the point portions of the teeth reside at said corner before the teeth are bent from the outer edge of the plate; and a cut line extending substantially perpendicular to the outer edge from the corner at the outer edge inward to the bend line of the teeth adjacent the apertures for bending of the teeth from the plate so that the teeth have an inner side that extends substantially perpendicular to the plate.

* * * * *